United States Patent
Liu et al.

(10) Patent No.: US 10,524,175 B2
(45) Date of Patent: Dec. 31, 2019

(54) DATA TRANSMISSION METHOD AND NETWORK DEVICE

(71) Applicant: HUAWEI TECHNOLOGIES CO., LTD., Shenzhen, Guangdong (CN)

(72) Inventors: Huiping Liu, Shanghai (CN); Min Huang, Shenzhen (CN); Lingli Pang, Shanghai (CN); Xiaoxiao Zheng, Shanghai (CN); Hao Bi, Rolling Meadows, IL (US)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/015,326

(22) Filed: Jun. 22, 2018

(65) Prior Publication Data
US 2018/0302830 A1 Oct. 18, 2018

Related U.S. Application Data

(63) Continuation of application No. PCT/CN2015/098764, filed on Dec. 24, 2015.

(51) Int. Cl.
*H04W 36/00* (2009.01)
*H04W 28/04* (2009.01)
(Continued)

(52) U.S. Cl.
CPC ........... *H04W 36/0088* (2013.01); *H04L 1/12* (2013.01); *H04L 1/1858* (2013.01);
(Continued)

(58) Field of Classification Search
CPC ....... H04L 69/16; H04L 47/10; H04L 47/193; H04L 47/28; H04L 4147/27;
(Continued)

(56) References Cited

U.S. PATENT DOCUMENTS

2005/0135248 A1* 6/2005 Ahuja .................... H04L 47/10
   370/235
2008/0198787 A1* 8/2008 Nguyen ............... H04L 1/0084
   370/315

(Continued)

FOREIGN PATENT DOCUMENTS

| CN | 101646204 A | 2/2010 |
|---|---|---|
| CN | 101677451 A | 3/2010 |
| EP | 2 418 910 A1 | 2/2012 |

OTHER PUBLICATIONS

International Search Report dated Sep. 19, 2016 in corresponding International Patent Application No. PCT/CN2015/098764.
(Continued)

*Primary Examiner* — Phuoc H Doan
(74) *Attorney, Agent, or Firm* — Womble Bond Dickinson (US) LLP

(57) ABSTRACT

When a condition of handing over user equipment from a cell in which a first network device is located to a cell in which a second network device is located is met, the first network device sends first information to the second network device, where the first information includes at least one of a CWND, a slow start threshold, a window scale factor, a RWND, and a TCP segment length; the slow start threshold is a value of demarcation between a slow start state and a congestion state; the window scale factor is a window scale factor carried in a SYN packet when a TCP connection is set up; the RWND is a maximum data volume that can be received by the user equipment; and the TCP segment length is a length of a maximum TCP segment that can be sent by the first network device.

15 Claims, 2 Drawing Sheets

(51) Int. Cl.
| | |
|---|---|
| *H04L 29/06* | (2006.01) |
| *H04W 36/30* | (2009.01) |
| *H04L 1/12* | (2006.01) |
| *H04L 1/18* | (2006.01) |
| *H04W 36/02* | (2009.01) |

(52) U.S. Cl.
CPC ............ *H04L 1/1874* (2013.01); *H04L 69/16* (2013.01); *H04L 69/163* (2013.01); *H04W 28/04* (2013.01); *H04W 36/0033* (2013.01); *H04W 36/0044* (2013.01); *H04W 36/30* (2013.01); *H04W 36/023* (2013.01)

(58) Field of Classification Search
CPC ....... H04L 69/163; H04L 47/37; H04L 47/27; H04W 28/04; H04W 36/0033; H04W 36/0088

USPC ..... 370/315, 230, 231, 236.1, 235; 709/204, 709/224, 231
See application file for complete search history.

(56) References Cited

U.S. PATENT DOCUMENTS

| | | |
|---|---|---|
| 2013/0114408 A1 | 5/2013 | Sastry et al. |
| 2015/0296418 A1 | 10/2015 | Szilagyi et al. |

OTHER PUBLICATIONS

International Search Report dated Sep. 19, 2016, in corresponding International Patent Application No. PCT/CN2015/098764, 4 pgs.
Ben-Othman, Jalel et al., "Performance Evaluation of TCP Handoffs Over Mobile IP Connections," IEEE 2008, pp. 366-372.
Extended European Search Report, dated Oct. 24, 2018, in European Application No. 15911147.5 (11 pp.).

\* cited by examiner

DATA TRANSMISSION METHOD AND NETWORK DEVICE

CROSS-REFERENCE TO RELATED APPLICATIONS

This application is a continuation of International Application No. PCT/CN2015/098764, filed on Dec. 24, 2015, the disclosure of which is hereby incorporated by reference in its entirety.

TECHNICAL FIELD

The present disclosure relates to the field of communications technologies, and in particular, to a data transmission method and a network device.

BACKGROUND

Transmission control protocol (TCP) is a connection-orientated, reliable, and byte-stream-based transport layer communication protocol, and is widely applied to the Internet and a mobile network. The TCP protocol is originally designed for a wired network environment condition. An assumption implicitly exists in the TCP protocol used for wired transmission: All packet losses are caused by network congestion. However, this does not hold true for a wireless network or the assumption cannot be well met in a wireless network environment. The wireless network environment has features such as small bandwidth, a large delay, and mobility. Consequently, working efficiency of TCP in the wireless network is reduced.

To resolve the problem, a TCP proxy mechanism is used. To be specific, a network device is disposed between user equipment (UE) and a server, there is a TCP connection based on an air interface wireless environment between the UE and the network device, and there is a wired TCP connection between the network device and the server, so as to optimize the working efficiency of TCP in the wireless network. However, when the UE moves from one cell to another cell, parameters used to control a TCP connection between the UE and the server are lost in a source network device. Consequently, a target network device cannot maintain the TCP connection between the UE and the server based on these parameters, and accordingly service continuity cannot be ensured.

SUMMARY

Embodiments of the present disclosure disclose a data transmission method and a network device, so as to ensure service continuity.

A first aspect of the embodiments of the present disclosure discloses a data transmission method, where the method is applied to a first network device used for data transmission, and includes:

when a condition of handing over UE from a cell in which the first network device is located to a cell in which a second network device is located is met, sending, by the first network device, first information to the second network device, where the first information may include at least one of a congestion window (CWND), a slow start threshold (Ssthresh), a window scale factor, a receiver window (RWND), and a TCP segment length. Ssthresh is a value of demarcation between a slow start state and a congestion state, the window scale factor is a window scale factor carried in a synchronization (SYN) packet when a TCP connection is set up, the RWND is a maximum data volume that can be received by the UE, the TCP segment length is a length of a maximum TCP segment that can be sent by the first network device, and the UE is any one of UEs in communication with the first network device by using a wireless network. The current condition may be a measurement result reported after the UE measures a neighboring cell based on measurement configuration delivered by the first network device, or may be determined by the first network device itself without the need of a measurement result.

In an embodiment, the first information may further include an IP address, a TCP port, a TCP sequence number, and a TCP ACK number of the UE, and an IP address, a TCP port, a TCP sequence number, and a TCP ACK number of a server. There is a TCP connection between the server and the UE. There is a wired TCP connection between the server and the first network device.

In an embodiment, when the condition of handing over the UE from the cell in which the first network device is located to the cell in which the second network device is located is met, the first network device may first obtain capability information of the second network device from the UE or the second network device. When the capability information indicates that the second network device has a TCP proxy function, the first network device sends the first information to the second network device.

In an embodiment, when the first network device needs to send buffer data to the UE, the first network device may send, to the second network device, the buffer data that carries the first information, or may directly send the first information to the second network device.

In an embodiment, when the condition of handing over the UE from the cell in which the first network device is located to the cell in which the second network device is located is met, the first network device may first receive a request that is sent by the UE or the second network device and that is used to instruct the first network device to send the first information to the second network device, and then send the first information to the second network device based on the request.

A second aspect of the embodiments of the present disclosure discloses a network device, including a processor, a memory, and a communications interface. The memory is configured to store a set of program code. The processor is configured to execute the program code stored in the memory. The communications interface is configured to communicate, under control of the processor, with a target network device and UE. When the processor executes the program code stored in the memory, the processor may control the communications interface to perform the method disclosed according to the first aspect of the embodiments of the present disclosure.

A third aspect of the embodiments of the present disclosure discloses a network device. A unit included in the network device can perform the method disclosed according to the first aspect of the embodiments of the present disclosure.

A fourth aspect of the embodiments of the present disclosure discloses a network device readable storage medium. The network device readable storage medium stores program code used by a network device to perform the method disclosed according to the first aspect of the embodiments of the present disclosure.

In the embodiments of the present disclosure, when the condition of handing over the UE from a cell in which a source network device is located to a cell in which a target network device is located is met, the source network device sends, to the target network device, first information used to control a TCP connection between the UE and the server, so as to ensure service continuity.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by persons of ordinary skill in the art based on the embodiments of the present disclosure without creative efforts shall fall within the protection scope of the present disclosure.

The embodiments of the present disclosure disclose a data transmission method and a network device, so as to ensure service continuity. Details are separately described in the following.

Figure 1:
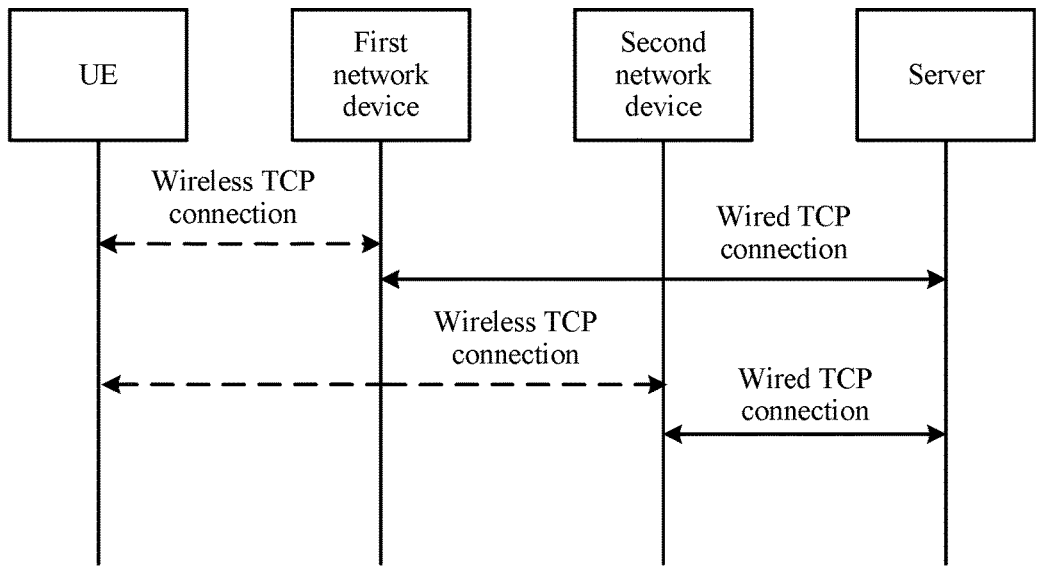
FIG. 1 shows a data transmission network architecture according to an embodiment of the present disclosure.

To better understand the data transmission method disclosed in the embodiments of the present disclosure, an application scenario of the embodiments of the present disclosure is described first. Referring to FIG. 1, FIG. 1 shows a data transmission network architecture according to an embodiment of the present disclosure. As shown in FIG. 1, the data transmission network architecture includes UE 101, a first network device 102, a second network device 103, and a server 104.

There is a TCP connection based on an air interface wireless environment between the UE 101 and the first network device 102, and the UE 101 is located in a coverage area of a cell in which the first network device 102 is located. There is a wired TCP connection between the first network device 102 and the server 104. The server 104 sends data to the first network device 102 by using the wired TCP connection, and the first network device 102 uses the TCP connection based on the air interface wireless environment to send, to the UE 101, the data sent by the server 104. The first network device 102 has a TCP proxy function, and maintains parameters used to control a TCP connection between the UE 101 and the server 104. When the UE 101 needs to be handed over from the cell in which the first network device 102 is located to a cell in which the second network device 103 is located, if the second network device has a TCP proxy function, the first network device 102 sends the parameters maintained by the first network device 102 to the second network device 103, so that the second network device 103 maintains the TCP connection between the UE 101 and the server 104 by using these parameters. In this way, service continuity can be ensured when cell handover is performed on the UE 101. The first network device 102 and the second network device 103 may be base stations, core network nodes, or the like. The UE 101 may be UE in a wireless communications system, to be specific, a terminal, a sensor, a machine-type device, or the like of various types. TCP proxy is also referred to as TCP performance enhancement in which a TCP packet may be optimized in a radio access network (RAN) by performing processing such as acknowledgment (ACK) splitting, DupACK duplication, local retransmission, or uplink/downlink data packet sorting.

A network device parses and performs additional processing on a TCP/IP packet, and accelerates a slow start, fast retransmission, and recovery process of a server in a downlink data transmission process by using TCP performance optimization technologies such as downlink data buffer sorting, ACK splitting, DupACK duplication, and local sending and retransmission performed by the network device. Therefore, some slow start processes caused by timeout can be avoided, and impact of an extremely large delay and delay jitter of the network device, a packet loss, a packet loss in a core network, disorder, and the like on TCP data transmission performance can be reduced. In addition, because of special processing of a submission manner and a change of a TCP notification window, impact of RLC submission manner configuration on a UE receiver window size and the like is reduced, and TCP data transmission efficiency and a data service throughput rate are improved. A TCP proxy function of the network device includes ACK splitting monitoring, ACK splitting, DupACK duplication, local sending and retransmission, and data packet sorting.

1. ACK Splitting Monitoring

The network device estimates a change status of CWND in a server, and determines, based on the window, whether to perform ACK splitting. A reason for implementing ACK splitting monitoring is as follows: Upon reception of an ACK, a quantity of packets that can be sent by the server is min{CWND, UE receiver window size}—flightsize, where flightsize is a quantity of data packets that are sent by the server but have not been acknowledged. If the CWND is greater than or equal to the UE receiver window size, there is no sense in increasing the CWND because the min{CWND, UE receiver window size} is equal to the UE receiver window size in this case, and a maximum value of flightsize does not exceed the UE receiver window size. ACK splitting monitoring is mainly implemented by maintaining variables CWND and ssthresh in the network device, and the variables CWND and ssthresh in the network device need to be consistent with CWND and ssthresh on a server at any moment.

2. ACK Splitting

According to a feature, in a TCP mechanism, in which a congestion window is updated based on a quantity of received ACKs, expansion of the congestion window is accelerated by increasing the quantity of ACKs, so that a congestion window of a transmit end of the network device can increase to a relatively large value in a short time. When a server is in a slow start state, the congestion window may be rapidly expanded by performing ACK splitting. When the server is in fast retransmission and congestion avoidance states, increase of the congestion window can also be accelerated by performing ACK splitting. For example, if the network device receives an ACK request 2921, and a quantity of split ACKs is 3, ACKs sent from the network device are an ACK request 2918, an ACK request 2919, an ACK request 2920, and the ACK request 2921. In this way, rapid increase of the CWND can be accelerated, and increase of the congestion window at the transmit end can be facilitated.

3. DupACK Duplication

According to a feature, in a TCP mechanism, in which a lost packet is fast retransmitted after a server receives three DupACKs, after the network device receives an ACK sent by UE, if the network device detects that a packet requested by the ACK is not in a buffer, it is assumed that the requested packet may be lost during transmission, and three DupACKs obtained through duplication are immediately sent to the server. Therefore, time consumed for packet retransmission is shortened, and overall TCP data transmission performance is improved.

4. Local Sending and Retransmission

A data packet sent by a server is first buffered in the network device, and then is sent to UE by the network device. When finding, based on a received ACK sent by the UE, that a packet loss occurs on an air interface, the network device instead of the server first performs local retransmission for the UE. Therefore, retransmission time is shortened, and an operation of halving a congestion window in the server during fast retransmission is also avoided to a relatively large extent.

5. Data Packet Sorting

Uplink data packets are sorted, so that uploaded data is submitted to a core network in order, and after the uploaded data reaches a receive end of a server, a possibility of disordered TCP data packets is extremely small. Therefore, the receive end avoids sending an unnecessary DupACK to a great extent. For example, UE sends a data packet 1 and a data packet 2. Because a bit error occurs on an air interface, the packet 2 first reaches the server, and the server sends a DupACK to request the packet 1. In this way, the UE enters a fast retransmission phase, and a congestion window (CWND) is halved. When reaching the network device with TPE, the packet 2 first enters a buffer, and after the packet 1 reaches the network device, the packet 1 and the packet 2 are sent to the server.

Figure 2:
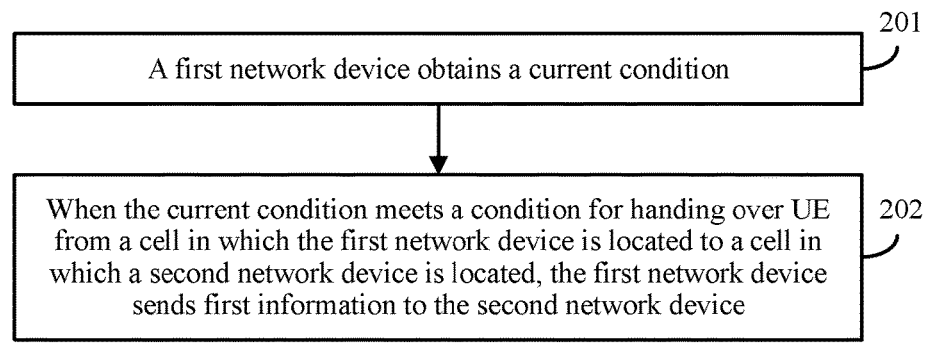
FIG. 2 is a flowchart of a data transmission method according to an embodiment of the present disclosure.

Based on the data transmission network architecture shown in FIG. 1, referring to FIG. 2, FIG. 2 is a flowchart of a data transmission method according to an embodiment of the present disclosure. The data transmission method shown in FIG. 2 is described from a perspective of a first network device 102. As shown in FIG. 2, the data transmission method may include the following steps.

201. The first network device obtains a current condition.

In this embodiment, the first network device may obtain the current condition in real time or periodically. The current condition may be a measurement result reported after UE measures a neighboring cell based on measurement configuration delivered by the first network device, or may be determined by the first network device itself without the need of a measurement result.

202. When the condition of handing over UE from a cell in which the first network device is located to a cell in which a second network device is located is met, the first network device sends first information to the second network device.

In this embodiment, when the condition of handing over the UE from the cell in which the first network device is located to the cell in which the second network device is located is met, the first network device sends, to the second network device, the first information used to control a TCP connection between the UE and a server. The first information may include at least one of CWND, a slow start threshold (Ssthresh), a window scale factor, RWND, and a TCP segment length.

In this embodiment, CWND in the first network device needs to be consistent with CWND in the server. An initial value of the CWND is set to two maximum segment sizes (MSS). The MSS is a length of a maximum TCP packet that can be sent by a transmit end of the first network device. This is consistent with an initial value of the CWND on a server end that is set to two MSSs. If data received by the first network device from a TCP transmit end exists in a buffer of the first network device, or data sent by a TCP transmit end has been acknowledged, the first network device considers that the TCP transmit end enters a slow start state. In a slow start phase, each time the first network device returns an ACK to the TCP transmit end, the CWND is increased by one MSS. When the CWND is greater than or equal to ssthresh, the TCP transmit end enters a congestion avoidance phase. Each time the first network device returns an ACK to the TCP transmit end, the CWND is increased by MSS*MSS/CWND+MSS/8. After the first network device receives an ACK from the UE, if a packet requested by the ACK is not in the buffer of the first network device, and the first network device receives a packet following the packet, it is considered that the TCP transmit end enters a fast retransmission phase. In the fast retransmission phase, ssthresh is set to max{CWND/2, 2*MSS}, and the CWND is set to max{CWND/2, 2*MSS}. Then, each time the first network device returns a DupACK to the TCP transmit end, the CWND is increased by one MSS, and fast retransmission does not end until a packet requested by an ACK is in a TCP proxy buffer. In this case, the CWND is set to ssthresh, and the congestion avoidance phase is entered. A value of ssthresh in the first network device needs to be consistent with a slow start threshold ssthresh in the server. When an initial TCP connection is set up, the value of ssthresh is set to a size of the buffer of the first network device, and is consistent with initial ssthresh in the server. In the slow start phase, ssthresh is set to max{CWND/2, 2*MSS}. A window scale factor in the first network device is a window scale factor carried in an option of a synchronization (SYN) packet when a TCP connection is set up. RWND maintained in the first network device is a UE receiver window size, and is in an uplink ACK packet sent by the UE. A variable MSS in the first network device is a length of a maximum TCP segment sent by the TCP transmit end. The value is obtained through negotiation during a three-way handshake process of setting up the initial TCP connection.

In this embodiment, the first information may further include an IP address, a TCP port, a TCP sequence number, and a TCP ACK number of the UE, and an IP address, a TCP port, a TCP sequence number, and a TCP ACK number of the server, and is used to indicate information about a TCP connection between the UE and the server.

In a possible implementation, when the condition of handing over the UE from the cell in which the first network device is located to the cell in which the second network device is located is met, and the first network device needs to send buffer data to the UE, the first network device further needs to send the buffer data to the second network device. The first network device may separately send the buffer data and the first information to the second network device, or may add the first information to the buffer data and send the buffer data to the second network device.

In a possible implementation, when the condition of handing over the UE from the cell in which the first network device is located to the cell in which the second network device is located is met, the first network device may first obtain capability information of the second network device from the UE or the second network device. The first network device sends the first information to the second network device only when the capability information of the second network device indicates that the second network device has a TCP proxy function.

In a possible implementation, when the condition of handing over the UE from the cell in which the first network device is located to the cell in which the second network device is located is met, after the first network device receives a request that is sent by the UE or the second network device and that is used to instruct the first network device to send the first information to the second network device, the first network device sends the first information to the second network device based on the request.

In a possible implementation, when the condition of handing over the UE from the cell in which the first network device is located to the cell in which the second network device is located is met, if there is a wired interface between the first network device and the second network device, the first network device may send the first information to the second network device by using an X2 interface. If there is no wired interface between the first network device and the second network device, the first network device may send the first information to the second network device by using an Si interface.

According to the data transmission method described in FIG. 2, when the condition of handing over the UE from a cell in which a source network device is located to a cell in which a target network device is located is met, the source network device sends, to the target network device, first information used to control a TCP connection between the UE and the server, so as to ensure service continuity.

Figure 3:
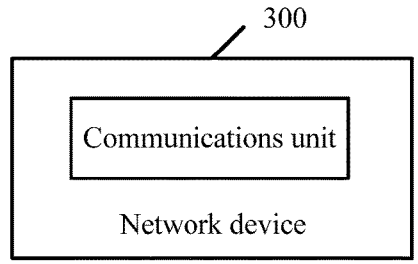
FIG. 3 is a structural diagram of a network device according to an embodiment of the present disclosure.

Referring to FIG. 3, FIG. 3 is a structural diagram of a network device 300 according to an embodiment of the present disclosure. As shown in FIG. 3, the network device 300 may include:

a communications unit, configured to: when a condition of handing over UE from a cell in which a source network device is located to a cell in which a target network device is located is met, send first information to the target network device. The first information may include at least one of a congestion window (CWND), a slow start threshold, a window scale factor, a receiver window (RWND), and a TCP segment length. The source network device is the network device 300.

The slow start threshold is a value of demarcation between a slow start state and a congestion state.

The window scale factor is a window scale factor carried in a synchronization (SYN) packet when a TCP connection is set up.

The RWND is a maximum data volume that can be received by the UE.

The TCP segment length is a length of a maximum TCP segment that can be sent by the source network device.

In a possible implementation, the first information may further include an
IP address, a TCP port, a TCP sequence number, and a TCP ACK number of the UE, and an IP address, a TCP port, a TCP sequence number, and a TCP ACK number of a server.

In a possible implementation, when the condition of handing over the UE from the cell in which the source network device is located to the cell in which the target network device is located is met, the communications unit is further configured to: obtain capability information of the target network device from the UE or the target network device, and when the capability information indicates that the target network device has a TCP proxy function, send the first information to the target network device.

In a possible implementation, the communications unit is specifically configured to: when the source network device needs to send buffer data to the UE, send, to the target network device, the buffer data that carries the first information.

In a possible implementation, the communications unit is further configured to: receive a request that is sent by the UE or the target network device and that is used to instruct the source network device to send the first information to the target network device, and send the first information to the target network device based on the request.

According to the network device described in FIG. 3, when the condition of handing over the UE from the cell in which the source network device is located to the cell in which the target network device is located is met, the source network device sends, to the target network device, the first information used to control a TCP connection between the UE and the server, so as to ensure service continuity.

Figure 4:
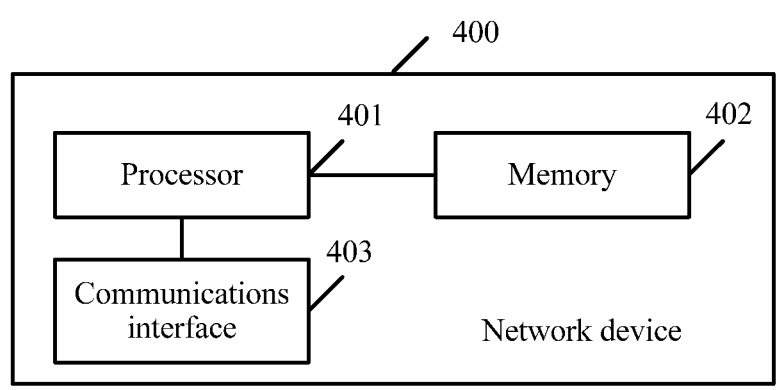
FIG. 4 is a structural diagram of another network device according to an embodiment of the present disclosure.

Referring to FIG. 4, FIG. 4 is a structural diagram of another network device according to an embodiment of the present disclosure. As shown in FIG. 4, a processor 401, a memory 402, and a communications interface 403 are included.

The memory 402 stores a set of program code, and the processor 401 is configured to invoke the program code stored in the memory 402 to control the communications interface 403 to perform the following operation:

when a condition of handing over UE from a cell in which a source network device is located to a cell in which a target network device is located is met, sending first information to the target network device. The first information may include at least one of a congestion window (CWND), a slow start threshold, a window scale factor, a receiver window (RWND), and a TCP segment length.

The slow start threshold is a value of demarcation between a slow start state and a congestion state.

The window scale factor is a window scale factor carried in a synchronization (SYN) packet when a TCP connection is set up.

The RWND is a maximum data volume that can be received by the UE.

The TCP segment length is a length of a maximum TCP segment that can be sent by the source network device.

In a possible implementation, the first information may further include an IP address, a TCP port, a TCP sequence number, and a TCP ACK number of the UE, and an IP address, a TCP port, a TCP sequence number, and a TCP ACK number of a server.

In a possible implementation, when the condition of handing over the UE from the cell in which the source network device is located to the cell in which the target network device is located is met, the processor 401 is further configured to invoke the program code stored in the memory 402 to control the communications interface 403 to perform the following operations:

obtaining capability information of the target network device from the UE or the target network device, and when the capability information indicates that the target network device has a TCP proxy function, sending the first information to the target network device.

In a possible implementation, a manner of controlling, by the processor 401, the communications interface 403 to send the first information to the target network device is specifically:

when the source network device needs to send buffer data to the UE, sending, to the target network device, the buffer data that carries the first information.

In a possible implementation, when the condition of handing over the UE from the cell in which the source network device is located to the cell in which the target network device is located is met, the processor 401 is further configured to invoke the program code stored in the memory 402 to control the communications interface 403 to perform the following operations:

receiving a request that is sent by the UE or the target network device and that is used to instruct the source network device to send the first information to the target network device, and sending the first information to the target network device based on the request.

According to the network device described in FIG. 4, when the condition of handing over the UE from the cell in which the source network device is located to the cell in which the target network device is located is met, the source network device sends the first information, to the target network device, used to control a TCP connection between the UE and the server, so as to ensure service continuity.

In an embodiment, this embodiment of the present disclosure further discloses a network device readable storage medium. The network device readable storage medium stores program code. When the program code in the network device readable storage medium is read by a network device, the network device can perform all steps of the data transmission method disclosed in the embodiments of the present disclosure.

It should be noted that, for brief description, the foregoing method embodiments are represented as a series of actions. However, persons skilled in the art should appreciate that the present disclosure is not limited to the described order of the actions, because according to the present disclosure, some steps may be performed in other orders or simultaneously. In addition, persons skilled in the art should also appreciate that all the embodiments described in the specification are embodiments as an example, and the related actions and modules are not necessarily mandatory to the present disclosure.

Persons of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

The data transmission method and the network device that are provided in the embodiments of the present disclosure are described above in detail. In this specification, specific examples are used to describe the principle and implementations of the present disclosure, and the description of the embodiments is only intended to help understand the method and core idea of the present disclosure. Meanwhile, persons of ordinary skill in the art may, based on the idea of the present disclosure, make modifications with respect to the specific implementations and the application scope. Therefore, the content of this specification shall not be construed as a limitation to the present disclosure.

What is claimed is:

1. A data transmission method applied to a first network device used for data transmission, and comprising:

obtaining, by the first network device, a current condition;

when the current condition meets a condition of handing over user equipment from a cell in which the first network device is located to a cell in which a second network device is located, sending, by the first network device to the second network device, first information to control connectivity between the user equipment and a server and comprising at least one of:

a congestion window (CWND), a slow start threshold comprising a value of demarcation between a slow start state and a congestion state, a window scale factor carried in a synchronization (SYN) packet when a transmission control protocol (TCP) connection is set up, a receiver window (RWND) comprising a maximum data volume that can be received by the user equipment, and a TCP segment length comprising a length of a maximum TCP segment that can be sent by the first network device.

2. The method according to claim 1, wherein the first information further comprises an IP address, a TCP port, a TCP sequence number, and a TCP ACK number of the user equipment, and an IP address, a TCP port, a TCP sequence number, and a TCP ACK number of a server.

3. The method according to claim 1, wherein the method further comprises:

obtaining, by the first network device, capability information of the second network device from the user equipment or the second network device; and when the capability information indicates that the second network device has a TCP proxy function, sending, by the first network device, the first information to the second network device.

4. The method according to claim 1, wherein the sending, by the first network device, first information to the second network device comprises:

when the first network device needs to send buffer data to the user equipment, sending, by the first network device to the second network device, the buffer data that carries the first information.

5. The method according to claim 1, wherein the method further comprises:

receiving, by the first network device, a request that is sent by the user equipment or the second network device and that is used to instruct the first network device to send the first information to the second network device; and sending, by the first network device, the first information to the second network device based on the request.

6. A network device, comprising:

a processor, configured to:

obtain a current condition;

determine whether the current condition meets a condition of handing over user equipment from a cell in which the network device is located to a cell in which a target network device is located; and a transmitter, configured to, when the condition is met, send to the target network device first information to control connectivity between the user equipment and a server and comprising at least one of:

a congestion window (CWND), a slow start threshold comprising a value of demarcation between a slow start state and a congestion state, a window scale factor comprising a window scale factor carried in a synchronization (SYN) packet when a transmission control protocol (TCP) connection is set up, a receiver window (RWND) comprising a maximum data volume that can be received by the user equipment, and a TCP segment length comprising a length of a maximum TCP segment that can be sent by the network device.

7. The network device according to claim 6, wherein the first information further comprises an IP address, a TCP port, a TCP sequence number, and a TCP ACK number of the user equipment, and an IP address, a TCP port, a TCP sequence number, and a TCP ACK number of a server.

8. The network device according to claim 6, wherein the processor is further configured to: obtain capability information of the target network device from the user equipment or the target network device, and when the capability information indicates that the target network device has a TCP proxy function, send the first information to the target network device.

9. The network device according to claim 6, wherein transmitter is configured to: when the network device needs to send buffer data to the user equipment, send, to the target network device, the buffer data that carries the first information.

10. The network device according to claim 6, further comprising: a receiver, configured to receive a request that is sent by the user equipment or the target network device and that is used to instruct the network device to send the first information to the target network device, and send the first information to the target network device based on the request.

11. An apparatus, comprising:
a communications interface;
a memory to store instructions; and
a processor configured to execute the instructions to control the communications interface to perform the following operation:
obtaining a current condition;
when the current condition meets a condition of handing over user equipment from a cell in which a source network device is located to a cell in which a target network device is located,
sending to the target network device first information to control connectivity between the user equipment and a server and comprising at least one of:
a congestion window (CWND),
a slow start threshold comprising a value of demarcation between a slow start state and a congestion state,
a window scale factor comprising a window scale factor carried in a synchronization (SYN) packet when a transmission control protocol (TCP) connection is set up,
a receiver window (RWND) comprising a maximum data volume that can be received by the user equipment, and
a TCP segment length comprising a length of a maximum TCP segment that can be sent by the source network device.

12. The apparatus according to claim 11, wherein the first information further comprises an IP address, a TCP port, a TCP sequence number, and a TCP ACK number of the user equipment, and an IP address, a TCP port, a TCP sequence number, and a TCP ACK number of a server.

13. The apparatus according to claim 11, wherein the processor is further configured to execute the instructions to control the communications interface to perform the following operations:
obtaining capability information of the target network device from the user equipment or the target network device, and when the capability information indicates that the target network device has a TCP proxy function, sending the first information to the target network device.

14. The apparatus according to claim 11, wherein a manner of controlling, by the processor, the communications interface to send the first information to the target network device is:
when the source network device needs to send buffer data to the user equipment, sending, to the target network device, the buffer data that carries the first information.

15. The apparatus according to claim 11, wherein the processor is further configured to execute the instructions to control the communications interface to perform the following operations:
receiving a request that is sent by the user equipment or the target network device and that is used to instruct the source network device to send the first information to the target network device, and sending the first information to the target network device based on the request.

* * * * *